United States Patent
Lee et al.

(10) Patent No.: US 7,971,442 B2
(45) Date of Patent: Jul. 5, 2011

(54) METHOD FOR CONTROLLING AIR CONDITIONER OF VEHICLES

(75) Inventors: Jeonghoon Lee, Daejeon-si (KR); Saewon Oh, Daejeon-si (KR)

(73) Assignee: Halla Climate Control Corporation, Daejeon-si (KR)

( * ) Notice: Subject to any disclaimer, the term of this patent is extended or adjusted under 35 U.S.C. 154(b) by 1111 days.

(21) Appl. No.: 11/788,277

(22) Filed: Apr. 19, 2007

(65) Prior Publication Data

US 2007/0245754 A1    Oct. 25, 2007

(30) Foreign Application Priority Data

Apr. 25, 2006  (KR) .................. 10-2006-0037025
Apr. 17, 2007  (KR) .................. 10-2007-0037313

(51) Int. Cl.
*G05D 23/32* (2006.01)

(52) U.S. Cl. ............... 62/158; 62/244; 62/157; 62/180; 62/190; 62/215; 62/226; 62/227; 62/229; 62/228.1; 62/228.3; 62/228.5; 236/78 D; 417/222.1; 417/222.2

(58) Field of Classification Search ............ 62/244, 62/157, 158, 180, 190, 215, 226, 227, 229, 62/228.1, 228.3, 228.5; 236/78 D; 417/222.1, 417/222.2
See application file for complete search history.

(56) References Cited

U.S. PATENT DOCUMENTS

| | | | | |
|---|---|---|---|---|
| 4,537,038 A * | 8/1985 | Alsenz et al. | ................. | 62/118 |
| 4,909,043 A * | 3/1990 | Masauji et al. | ................ | 62/158 |
| 4,959,974 A * | 10/1990 | Kusakabe | ................. | 62/228.5 |
| 7,096,680 B2 * | 8/2006 | Sugesawa et al. | ................ | 62/133 |
| 7,228,694 B2 * | 6/2007 | Schwarz et al. | .............. | 62/228.4 |
| 7,594,410 B2 * | 9/2009 | Lee et al. | ................. | 62/228.3 |
| 7,658,080 B2 * | 2/2010 | Lee | ................. | 62/227 |
| 2001/0005991 A1 * | 7/2001 | Niimi et al. | ................. | 62/133 |
| 2001/0022090 A1 * | 9/2001 | Takano et al. | ............... | 62/228.5 |
| 2006/0037335 A1 * | 2/2006 | Song et al. | ................ | 62/196.3 |
| 2006/0088424 A1 | 4/2006 | Lee | | |
| 2007/0039340 A1 * | 2/2007 | Lee | ................. | 62/228.1 |

FOREIGN PATENT DOCUMENTS

| | | |
|---|---|---|
| EP | 1 650 67 A | 4/2006 |
| JP | 58 078819 A | 5/1983 |
| JP | 59 038118 A | 3/1984 |
| JP | 02230056 A * | 9/1990 |
| JP | 2003-200730 | 7/2003 |

* cited by examiner

*Primary Examiner* — Frantz F Jules
*Assistant Examiner* — Azim Rahim
(74) *Attorney, Agent, or Firm* — Fulbright & Jaworski L.L.P.

(57) ABSTRACT

The present invention relates to a method for controlling a vehicle air-conditioner, which can prevent undershoot of an evaporator by performing a maximum capacity control or controlling an discharge capacity of a compressor through the outputting of an discharge capacity control value of the compressor directly before the stop of the air conditioner, and can improve the pleasant feelings of the passengers by preventing delay of response, which converges into the target temperature of the evaporator due to the delay of the decrease of the temperature of the evaporator.

7 Claims, 4 Drawing Sheets

METHOD FOR CONTROLLING AIR CONDITIONER OF VEHICLES

This application claims priority from Korean Patent Application No. 10-2006-0037025 filed Apr. 25, 2006 and Korean Patent Application No. 10-2007-0037313 filed Apr. 17 2007, each incorporated herein by reference in their entireties.

BACKGROUND OF THE INVENTION

1. Field of the Invention

The present invention relates to a method for controlling an air conditioner for a vehicle, in particular, to a method for controlling an air conditioner for a vehicle, which can prevent undershoot of an evaporator by performing a maximum capacity control or controlling a discharge capacity of a compressor through the output of a control value of the discharge capacity of the compressor directly before the stop of the air conditioner, and can improve the pleasant feelings of the passengers by preventing delay of response, which converges into the target temperature of the evaporator due to the delay of the temperature decrease of the evaporator.

2. Background of the Related Art

In general, with regard to a vehicle, especially, a vehicle with an internal combustion engine, which produces power by burning fossil fuel as a power source, has been generalized and mass-produced. Recently, a hybrid vehicle has been developed, which can be operated by the power selectively transferred from a motor or an internal combustion engine due to problems associated with the harmful discharge gas according to the burning of the fossil fuel and the exhaustion of the fossil fuels, and the like.

Such a conventional vehicle is provided with an air conditioner for performing cooling and heating of vehicle indoors. In this regard, in connection with a construction of a cooling system in the air conditioner, a swash type compressor is employed as a compressor for supplying gaseous refrigerant with low temperature and pressure, which is introduced from the evaporator, to a condenser after compressing it into gaseous refrigerant with high temperature and pressure.

The swash type compressor is driven☐according to the turning on/off of an air conditioner (A/C) switch. When the compressor is driven, the temperature of the evaporator is decreased, and when the compressor is stopped, the temperature of the evaporator is increased.

Meanwhile, the swash type compressor can be divided into a fixed capacity type compressor and a variable capacity type compressor. Recently, the variable capacity type compressor is mainly used which can vary the discharge capacity.

The variable capacity swash type compressor generally employs a pressure control valve for controlling the discharge capacity of the refrigerant, and may sometimes employ an electronic control valve (ECV) using an electric force in place of the pressure control valve with a mechanical structure.

In other words, in case of the variable capacity swash type compressor employing the ECV, the inclination of the swash can be varied according to duty of the ECV, and the discharge capacity of the refrigerant is determined depending on the inclination of the swash.

As a result, the capacity of the refrigerant supplied to the evaporator is varied according to the duty of the ECV, and this means that the duty value of the evaporator is an important factor for determining the temperature of the evaporator.

In other words, in case of the variable capacity swash type compressor employing the ECV, the inclination of the swash can be varied according to duty of the ECV, and the discharge capacity of the refrigerant is determined depending on the inclination of the swash.

As a result, the duty value of the ECV is calculated by a time during which the ECV is turned on, among the whole operation time of the compressor, by percentage.

Accordingly, when the duty value is high, the discharge capacity of the refrigerant increases, and when the duty value is low, the discharge capacity of the refrigerant decreases.

With regard to the vehicle provided with the air conditioner having a variable capacity swash type compressor, it is necessary to operate the air conditioner according to the deviation of the temperature between the present temperature and the target temperature at the initial time of the operation of the air conditioner.

For instance, while the compressor is preferable to be driven at an discharge capacity which does not produce large noise, it goes without saying that target temperature of the evaporator can be effectively reached and the entrainment feeling is not worsen. In this regard, in Japanese Patent Laid-Open Publication No. 2003-200730, there is disclosed a technology of controlling the discharge capacity of the compressor by a proportional integral, after setting the duty of the ECV of a variable capacity swash type compressor with respect to the deviation between the target temperature of the evaporator and the present temperature.

According to the above technology, when the deviation between the target temperature of the evaporator and the present temperature is above a predetermined value, for instance, 3☐, a maximum capacity control is performed, and when the present temperature of the evaporator is lower than the target temperature of the evaporator by at least 3☐, a minimum capacity control is performed, so that the temperature control performance such as a temperature convergence, and a response time is dependent upon how a proportional gain and an integral gain are properly selected according to the system, when the proportional integral control is performed by the feed-back of the present temperature of the evaporator with respect to the target temperature of the evaporator.

However, the conventional art technology entails a problem in that the convergence and the pleasantness are degraded when the temperature of the outdoor air is low or the target temperature of the evaporator is high, since there occurs an undershoot phenomenon, in which the temperature of the evaporator drops sharply in case of performing the maximum capacity control at the initial time of the operation of the air conditioner, whereas the temperature of the evaporator become lower than the target temperature of the evaporator for a predetermined time.

Also, the conventional art technology encounters another problem in that the undershoot phenomenon is reduced but the time taken for converging into the target temperature of the evaporator is extended due to the delay of the decrease of the temperature of the evaporator, when the proportional-integral control is performed which is the maximum capacity control and concurrently the minimum capacity control at the initial time of the operation of the air conditioner.

SUMMARY OF THE INVENTION

Therefore, the present invention has been made in view of the above problems occurring in the prior art, and an object of the present invention is to provide a method for controlling an air conditioner for a vehicle, which can prevent undershoot of an evaporator by performing a maximum capacity control or controlling the discharge capacity of a compressor through the outputting of a control value of the discharge capacity of the compressor directly before the stop of the air conditioner, and can improve the pleasant feelings of the passengers by preventing delay of response property, which converges into the target temperature of the evaporator due to the delay of the decrease of the temperature of the evaporator.

To accomplish the above objects, according to the present invention, there is provided a method for controlling an air conditioner for a vehicle, in which the compressor is controlled by calculating an discharge capacity control value of a pressure control valve of a variable capacity swash type compressor by means of a proportional-integral control, characterized by comprising the steps of: determining if an A/C switch is turned on or not; determining if the temperature of the evaporator directly before turning off the A/C switch reaches a target temperature of the evaporator when the A/C switch is turned on, as a result of the determination; performing a control by outputting the discharge capacity control value of the compressor to the maximum and then performing the proportional-integral control, when the temperature of the evaporator directly before turning off the A/C switch does not reach the target temperature of the evaporator, and determining if a lapse time from the turning off of the A/C switch to the turning on thereof is below a control time when the temperature of the evaporator directly before turning off the A/C switch reaches the target temperature of the evaporator, as a result of the determination; performing the control by outputting the discharge capacity control value of the compressor to the maximum and then performing the proportional-integral control, when the lapse time from the turning off the A/C switch to the turning on thereof exceeds the control time, and concurrently performing the proportional-integral control after controlling the pressure control valve by outputting the discharge capacity control value of the compressor directly before turning off the A/C switch, when the lapse time from the turning off of the A/C switch to the turning on thereof is below the control time, as a result of the determination; determining if the A/C switch is turned off, after performing the proportional-integral control; and storing the discharge capacity control value of the compressor directly before turning off the A/C switch, when the A/C switch is turned off, and concurrently counting and storing the lapse time from the turning off of the A/C switch to the turning on thereof.

BRIEF DESCRIPTION OF THE DRAWINGS

The above and other objects, features and advantages of the present invention will be apparent from the following detailed description of the preferred embodiments of the present invention in conjunction with the accompanying drawings, in which.

DETAILED DESCRIPTION OF THE PREFERRED EMBODIMENT

Reference will now be made in detail to the preferred embodiment of a control method of vehicle air conditioner according to the present invention with reference to the attached drawings.

Figure 1:
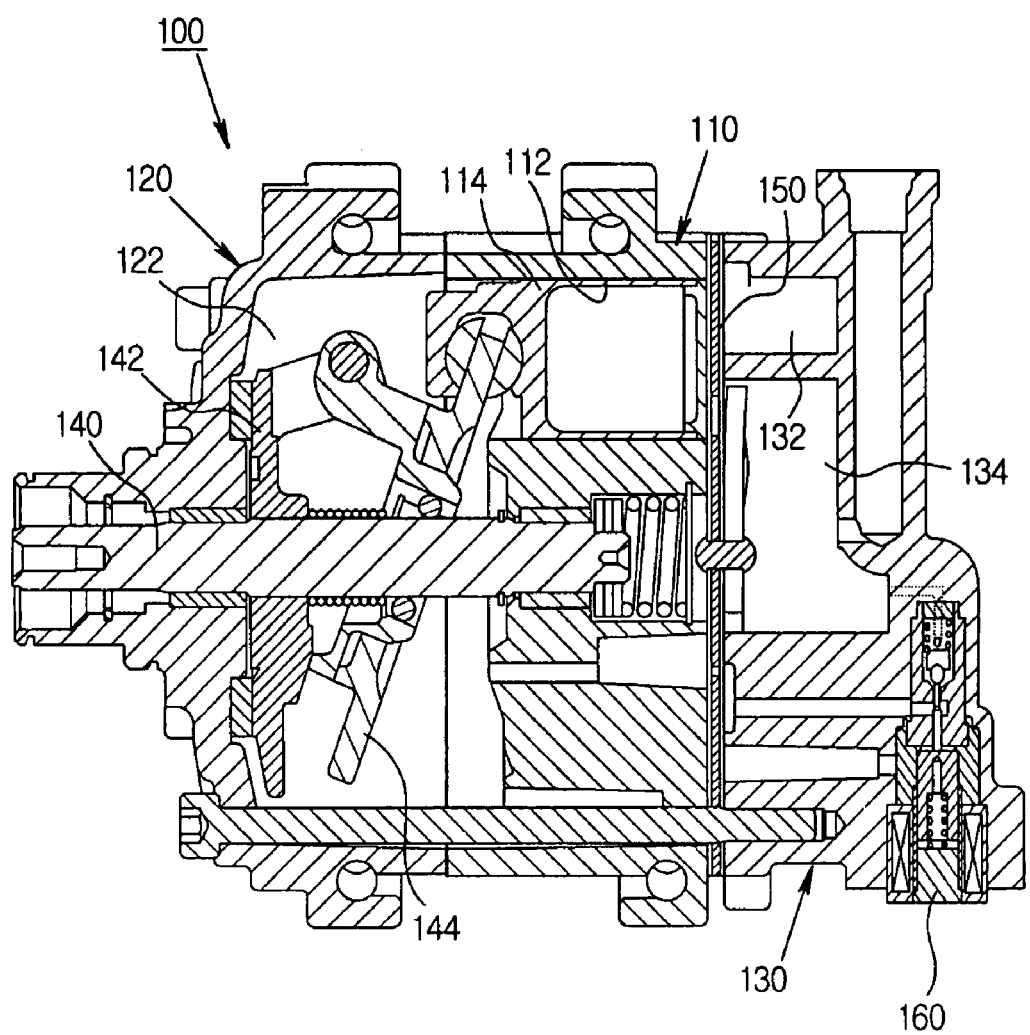
FIG. 1 is a cross-sectional view showing an example of a variable capacity swash type compressor to which the present invention is applied.
Figure 2:
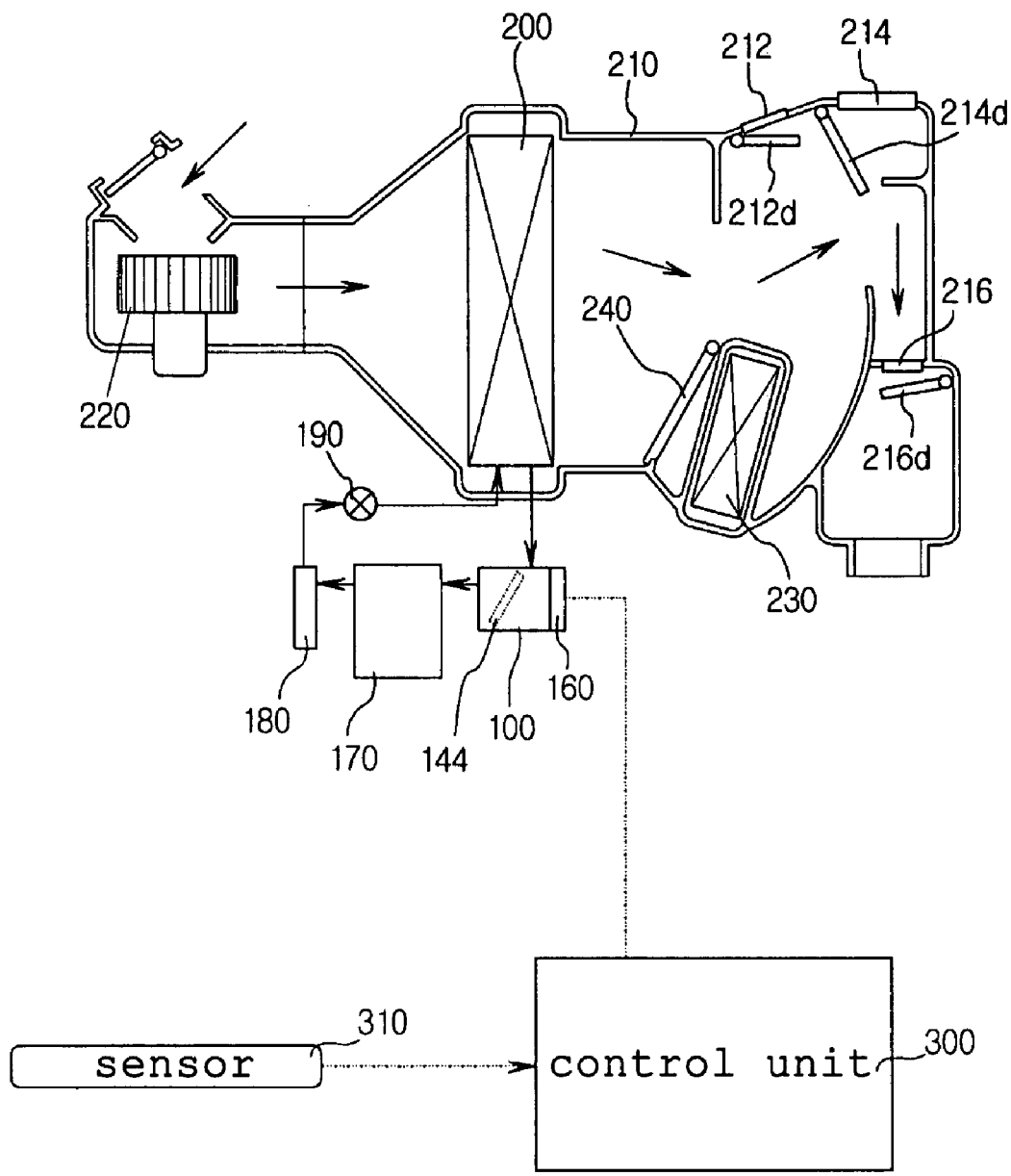
FIG. 2 is a view showing a construction of an air conditioner for performing a controlling method according to the present invention.
Figure 3:
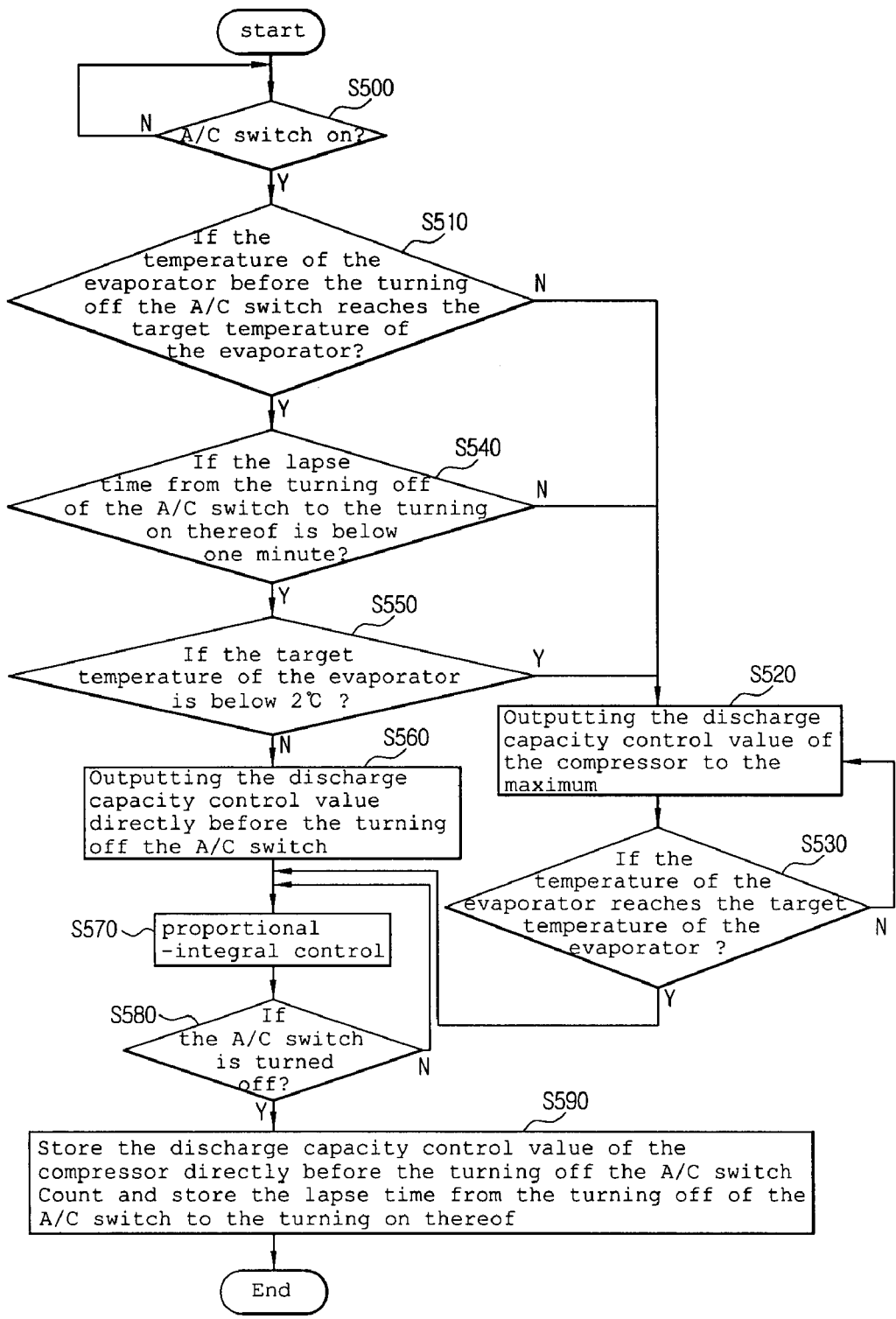
FIG. 3 is a flow chart showing the controlling method of the present invention.
Figure 4:
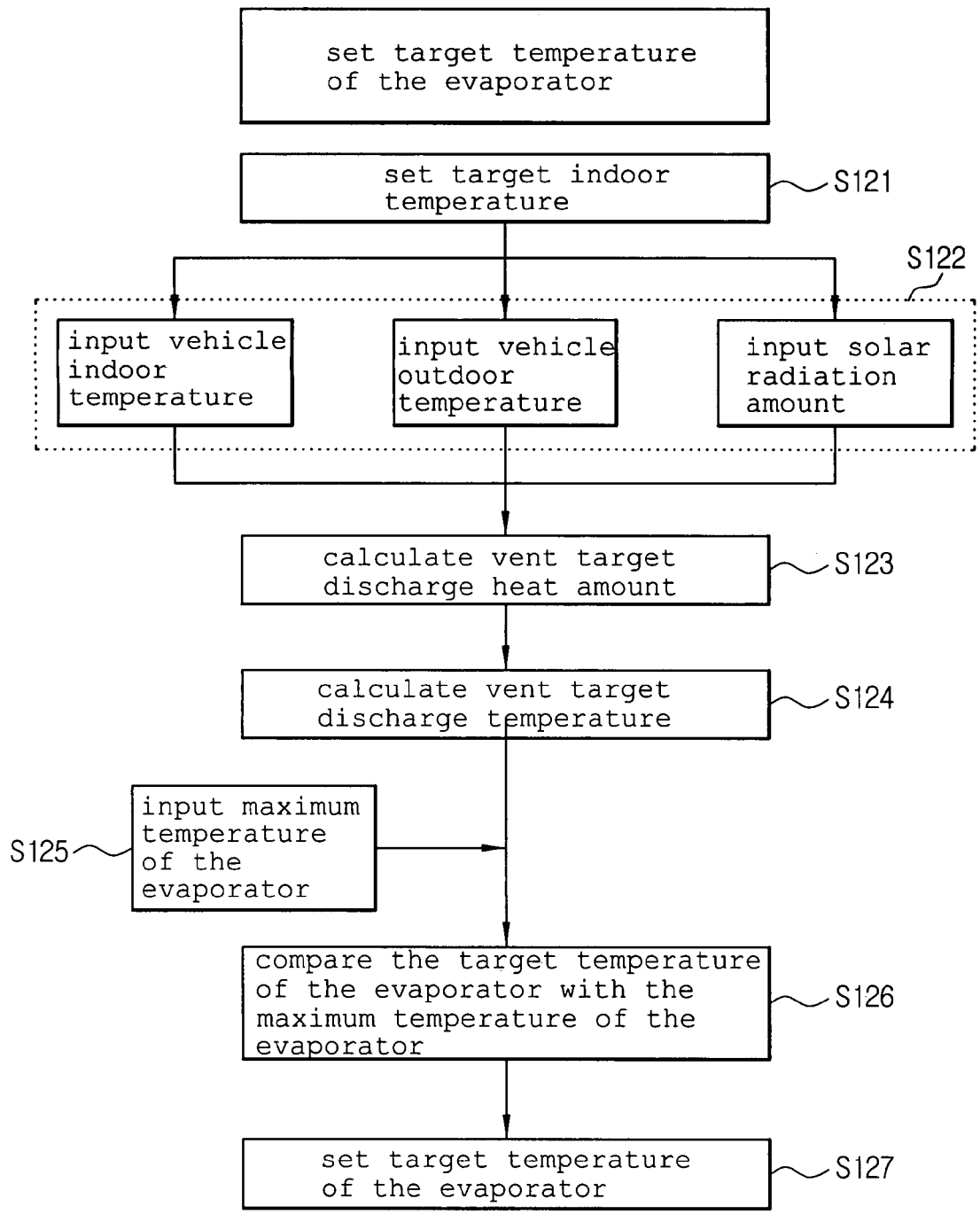
FIG. 4 is a flow chart showing a method of setting the target temperature of the evaporator according to the present invention.

FIG. 1 is a cross-sectional view showing an example of a variable capacity swash type compressor to which the present invention is applied, FIG. 2 is a view showing a construction of an air conditioner for performing a controlling method of the present invention, FIG. 3 is a flow chart showing the controlling method of the present invention, and FIG. 4 is a flow chart showing a method of setting the temperature of the target evaporator according to the present invention.

Prior to the description of the controlling method of the vehicle air conditioner according to the present invention, the variable capacity swash type compressor to which the present invention is applied will be described below at first.

The variable capacity swash type compressor 100 comprises, a cylinder block 110 formed with a plurality of cylinder bores 112 in the longitudinal direction along a concentric circle; a plurality of pistons 114 inserted into respective cylinder bore 112 formed at the cylinder block 110; a front housing 120 engaged with the front side of the cylinder block 110 for defining a crank chamber 122 therein; a rear housing 130 engaged with the rear side of the cylinder block 110 for defining a refrigerant suction chamber 132 and a refrigerant discharge chamber 134 therein; a driving shaft 140 supported over the front housing 120 and the cylinder block 110; a rotor 142 rotating with the driving shaft 140 at the inside of the crank chamber 122; a swash 144 disposed movably around the driving shaft 140, and is engaged with respective piston 114 at the edge for moving the piston 114 forward and rearward, and is hinge-engaged with the rotor 142 at one side; a valve unit 150 disposed intermediary between the cylinder block 110 and the rear housing 130 for introducing the refrigerant from the refrigerant suction chamber 132 to the cylinder bore 112, and discharging the compressed refrigerant from the cylinder bore 112 to the refrigerant discharge chamber 134; and a outside controlling type pressure control valve 160 disposed at the rear housing 130 for controlling the inclination angle of the swash 144 with respect to the driving shaft 140.

According to the variable capacity swash type compressor 100, a plurality of pistons 114 are moved forward and rearward in order by the rotation of the swash 144.

When the piston 114 is moved rearward from the cylinder bore 112 (at the time of the suction stroke), the refrigerant is inhaled from the suction chamber to the cylinder bore 112 since the cylinder bore 112 is communicated with the suction chamber by the opening of the suction side of the valve unit 150 due to the pressure reduction at the inside of the cylinder bore 112.

In addition, when the piston 114 is moved forward to the cylinder bore 112 (in other words, at the time of the compression stroke), the compressed refrigerant is emitted from the cylinder bore 112 to the refrigerant discharge chamber 134 since the inhaled refrigerant is compressed to thereby open the discharge side of the valve unit 150 to make the cylinder bore 112 be communicated with the refrigerant discharge chamber 134 due to the increase of the pressure at the inside of the cylinder bore 112.

Also, the discharge capacity of the refrigerant is varied by the change of the inclination angle of the swash 144 by means of the pressure control valve 160 according to the load.

In other words, the stroke distance of the piston 114 becomes bigger so far as the swash 144 is inclined to the driving shaft 140.

FIG. 2 shows the vehicle air conditioner system to which the variable capacity swash type compressor 100 is applied as described above.

As shown in FIG. 2, the vehicle air conditioner comprises, an air conditioning case 210, a blower 220 disposed at an inlet side of the air conditioning case 210, an evaporator 200 and a heater core 230 disposed in the air conditioning case 210, a temperature control door 240 for controlling the opening degree of a cool air passage and a hot air passage with respect to air passed through the evaporator 200, a variable capacity swash type compressor 100 for inhaling refrigerant from the evaporator 200 and emitting the inhaled refrigerant, a condenser 170 for condensing the refrigerant supplied from the compressor 100 and emitting the condensed refrigerant, a receiver-dryer 180 for separating vapor and liquid from the refrigerant supplied from the condenser 170, and an expansion valve 190 for throttling the refrigerant supplied from the receiver dryer 180 and supplying the throttled refrigerant to the evaporator 200.

Reference numerals 212, 214, and 216 represent a vent respectively, and reference numerals 212*d*, 214*d*, and 216*d* represent a door for controlling the opening degree of the vent 21, 214, and 216 respectively.

Meanwhile, a control unit 300 controls the driving output of the pressure control valve 160, which is operated to control the discharge capacity of the compressor 100 by the controlling of the inclination angle of the swash 144 with respect to the driving shaft 140.

In other words, the control unit 300 controls the output current value with respect to the pressure control valve 160 so that the discharge capacity of the compressor 100 can be varied by the change of the swash 144 with respect to the driving shaft 140.

Unexplained numeral 310 in FIG. 2 represents several sensors such as a temperature sensor of the evaporator, an indoor temperature sensor, an outdoor temperature sensor, a sensor for measuring solar radiation amount, and the like, and sensed signals are inputted into the control unit 300.

Hereinafter, the method for controlling the vehicle air conditioner according to the present invention will be described.

As shown in FIG. 3, if the A/C switch is determined to turned on (S500), signals from several sensors 310 are inputted into the control unit 300. In addition, a signal for representing the turning on of the A/C switch is also inputted.

Herein, while a separate numeral is not indicated for the A/C switch in FIG. 3, the control unit 300 applies current into an electronic clutch disposed at the compressor to rotate the driving shaft of the compressor by means of the power of the engine and apply desired output control value to the pressure control valve 160 of the compressor after it is inputted of the signal about the operation of the A/C switch, according to whether the A/C switch is pressed to be electrically turned on/off by the user.

Meanwhile, the A/C switch is turned on/off by a user so that the compressor can be operated and stopped as described above.

Also, irrespective of the general control manner of the A/C switch being turned on/off by the user so that the compressor is operated and stopped, the A/C switch can be electrically turned on/off by a fully automatic temperature controller (FATC) for fully automatically control the compressor, to thereby operate and stop the compressor.

Here, it can be interpreted as the air conditioner for the cooling is operated or stopped so that the A/C switch is turned on/off to thereby operate and stop the compressor.

When the A/C switch is operated, the control unit 300 is inputted of the signals from the several sensors 310 in order to set the target temperature of the evaporator.

Hereinafter, a process of setting the target temperature of the evaporator is described below with reference to FIG. 4.

The target temperature of the evaporator can be set as follows. In other words, as shown in FIG. 4, the user sets the target indoor temperature (S121).

Next, the vehicle indoor temperature, the vehicle outdoor temperature, and the solar radiation amount are sensed from the sensors 310 disposed at predetermined positions of the vehicle and inputted into the control unit 300 (S122).

Next, the target thermal discharge amount of the vents 212, 214, and 216 of the air conditioner is calculated based on the target indoor temperature, the vehicle indoor temperature, the vehicle outdoor temperature, and the solar radiation amount (S123), and the target discharge temperature of the vents 212, 214, and 216 of the air conditioner is calculated (S124).

Then, the maximum temperature of the evaporator is inputted (S125).

Then, the target temperature of the evaporator is set after comparing the target discharge temperature of the vents 212, 214, and 216 with the maximum temperature of the evaporator (S127).

Here, the step of inputting the maximum temperature of the evaporator is preferably to be performed by calculating and inputting the maximum temperature of the evaporator according to the temperature of the air introduced into the evaporator 200 at the time of the minimum driving of the compressor 100.

Also, when the target temperature of the evaporator is to be set at the step of comparing the target discharge temperature of the vents 212, 214, and 216 with the maximum temperature of the evaporator, if the target discharge temperature of the evaporator is lower than the maximum temperature of the evaporator, the target temperature of the evaporator is set to be the target discharge temperature, and if the target discharge temperature is higher than the maximum temperature of the evaporator, it is preferable to set the maximum temperature of the evaporator as the target temperature of the evaporator. In other words, the lower temperature is set to be the target temperature of the evaporator.

After executing the step S500, the control unit 300 determines if the temperature of the evaporator prior to the turning off of the A/C switch, reaches the target temperature of the evaporator (S510).

As a result of the determination of the step S510, if it is determined that the temperature of the evaporator does not reach the target temperature of the evaporator, the control unit 300 controls the pressure control valve 160 by outputting the discharge capacity control value to the maximum, performing the step S520 of controlling the pressure control valve 160, and then performing the proportional integral control (S570).

Herein, the step of performing the proportional-integral control of the step S570 will be described in more detail.

The control unit 300 calculates a temperature deviation between the target temperature of the evaporator and the real temperature of the evaporator. Then, a control coefficient is set based on the calculated temperature deviation. A proportional gain and an integral gain are used as the control coefficient, and the discharge capacity control value is variably calculated to control the pressure control valve 160 of the variable capacity swash type compressor 100 according to the proportional gain and the integral gain.

The discharge capacity control value can be obtained by the following equation.

$$\text{Duty}(n) = \text{Duty}(n-1) - Gp\{Evap\ \text{error}(n) - Evap\ \text{error}(n-1)\}(\text{proportional control}) - Gi\{Evap\ \text{error}(n)\}$$
(integral control)

Here, temperature deviation can be obtained based on the following equation, Evap error(n)=Tevap target−Evap now (n).

Herein, the Tevap target is the target temperature of the evaporator, the Evap now is the present temperature of the evaporator sensed n times by the evaporator temperature sensor, among the several sensors 310, Duty (n) is an discharge capacity control value of a $n^{-th}$ compressor, Gp represents the proportional gain, Gi represents the integral gain, Duty $(n-1)^{-th}$ is an discharge capacity control value of a $(n-1)^{-th}$ compressor, Evap error(n−1) is a $(n-1)^{-th}$ temperature deviation, which can be obtained from the equation of:

$$Evap\ error(n-1) = Tevap\ target - Evap\ now(n-1)$$

Accordingly, the pressure control valve 160 of the variable capacity swash type compressor 100 is controlled by the discharge capacity control value calculated as described above.

Thus, it is possible to prepare circumstances in which maximum cooling can be achieved in the vehicle indoors, because the inclination angle of the swash 144 is changed with respect to the driving shaft 140 to thereby increase the refrigerant discharge capacity of the compressor 100.

Then, after executing the step S520, the control unit 300 determines again whether the temperature of the evaporator reaches the target temperature of the evaporator (S530).

Here, in the present invention, if the temperature of the evaporator is within a range of ±2° C. of the target temperature of the evaporator, it is determined that the temperature of the evaporator approaches the target temperature of the evaporator.

If the temperature of the evaporator does not approach the target temperature of the evaporator at the step S530, the process is returned to the step S520, and if it is determined that the temperature of the evaporator approaches the target temperature of the evaporator, the control unit 300 progresses the step S570 of performing the proportional-integral control.

Meanwhile, if it is determined that the temperature of the evaporator approaches the target temperature of the evaporator at the above described step S510, the control unit 300 determines if the lapse time from the turning off of the A/C switch to the turning on thereof again is below the control time (S540).

As a result of the determination, if it is determined that the lapse time from the turning off of the A/C switch to the turning on thereof again exceeds the control time, the above described step S520 is performed.

Here, if the lapse time from the turning off of the A/C switch to the turning on thereof again exceeds the control time, since the passengers can not feel refreshing but feel warm in summer, the above described step S520 is performed to thereby control the compressor so that it performs the maximum cooling of the vehicle indoors.

Meanwhile, as a result of the determination in the step S540, the lapse time from the turning off of the A/C switch to the turning on thereof again is below the control time, a step S550 of determining whether the target temperature of the evaporator is below 2□.

Here, if the lapse time from the turning off of the A/C switch to the turning on thereof again becomes to be below the control time, the above described step S550 can be performed because cooling air conditioning circumstance, in which passengers in the vehicle indoors can feel refreshing, can be maintained for some times due to the operation of the compressor by the turning off of the A/C switch.

Here, the control time means a vaporizing time of the remaining refrigerant of the evaporator, and the temperature of the evaporator increases gradually as long as the time increases. Accordingly, it is possible to prevent the undershoot phenomenon of the evaporator, in which the temperature of the evaporator becomes to be lower than the target temperature of the evaporator according to the control time for turning off the A/C switch to the turning on thereof again, to make the air conditioner quickly reach the target temperature of the evaporator, and to quickly lower the discharge temperature of the evaporator to thereby improve the property of quick achieving the advantage, and pleasantness. In this instance, it is most preferable to set the control time to be one minute.

As a result of the determination at the step S550, if it is determined that the target temperature of the evaporator is below 2□, the step S520 is performed.

Meanwhile, as a result of the determination of the step S550, if it is determined that the target temperature of the evaporator exceeds 2□, the control unit 300 performs the step S570 of controlling the pressure control valve 160 by performing the step S560 of controlling the pressure control valve 160 through the output of discharge capacity control value of the compressor directly before turning off the A/C switch and then performing the proportional-integral control.

As described above, it is determined whether the A/C switch is turned off (S580), after executing the step S570.

As a result of the determination of the step S580, if the AC switch is not turned off, the control unit 300 determines continuously if the A/C switch is turned off.

Meanwhile, as a result of the determination at the step S580, if it is determined that the A/C switch is turned off, the control unit 300 stores the discharge capacity control value of the compressor directly before the turning off of the A/C switch, and concurrently counts and stores the lapse time from the turning off of the A/C switch to the turning on of it (S590).

Accordingly, the present invention repeatedly executes steps from S500 to S590 according to the turning on/off of the A/C (air conditioner) switch in the course of the vehicle driving.

Thus, according to the present invention, when the lapse time from the turning off of the A/C switch to the turning on is below one minute, which is the control time, at the stable state of the temperature controlling property, in which the temperature of the evaporator reaches the target temperature of the evaporator directly before the turning off of the A/C switch, it is possible to prevent the excessive occurrence of the undershoot phenomenon of the evaporator, in which the temperature of the evaporator becomes lower than the target temperature of the evaporator by performing the proportional integral control with the control output value of the pressure control valve of the compressor directly before the turning off of the A/C switch, at the time of the turning on of the A/C switch, and to reach the target temperature of the evaporator quickly at the same time.

Moreover, when the lapse time from the turning off of the A/C switch to the turning on of it exceeds one minute in the present invention, since the remaining refrigerant of the evaporator is sufficiently vaporized so that the compressor is at the temperature increased state, it is possible to improve the quick advantage achieving property and the pleasantness by performing the maximum cooling air conditioning control to thereby quickly lowering the temperature of the evaporator when the A/C switch is initially turned on.

Also, when the temperature control property directly before the turning off of the A/C switch is unstable, while the lapse time from the turning off of the A/C switch to the turning on thereof is below one minute, it is possible to improve the quick advantage achieving property and the pleasantness by performing the maximum cooling air conditioning control to thereby quickly lower the temperature of the evaporator when the A/C switch is initially turned on, and to stabilize the temperature of the evaporator early to thereby easily convert and perform the proportional-integral control.

Furthermore, when the target temperature of the evaporator is substantially low, for instance, below 2° C., it is possible to improve the quick advantage achieving property and the pleasantness so as to improve the cooling air conditioning property by performing the maximum cooling air conditioning control to thereby quickly lower the temperature of the evaporator when the A/C switch is initially turned on, and to stabilize the temperature of the evaporator early thereby easily converting and performing the proportional-integral control.

As described above, according to the controlling method of the vehicle air conditioner, it is possible to prevent the undershoot phenomenon by controlling the discharge capacity of the compressor by means of performing a maximum capacity control or outputting discharge capacity control value of the compressor directly before the stop of the air conditioner, and it is possible to improve the pleasant feelings of the passengers by preventing delay of reaction property, which converges into the target temperature of the evaporator due to the delay of the decrease of the temperature of the evaporator.

While the present invention has been described with reference to the particular preferred embodiments, it is not to be restricted by the embodiments but only by the appended claims. Also, it is to be appreciated that those skilled in the art can change or modify the embodiments without departing from the scope and spirit of the present invention, and such modifications are wholly pertained to scope of the appending claims.

What is claimed is:

1. A method for controlling an air conditioner for a vehicle, in which a compressor is controlled by calculating a discharge capacity control value of a pressure control valve of a variable capacity swash type compressor by means of a proportional-integral control, characterized by comprising the steps of:
   determining if an A/C switch is turned on or not;
   determining if the temperature of an evaporator directly before turning off the A/C switch reaches a target temperature of the evaporator when the A/C switch is turned on, as a result of determining if the A/C switch is turned on or not;
   performing a control by outputting the discharge capacity control value of the compressor to a maximum and then performing the proportional-integral control, when the temperature of the evaporator directly before turning off the A/C switch does not reach the target temperature of the evaporator, and determining if a lapse time from the turning off of the A/C switch to the turning on thereof is below a control time when the temperature of the evaporator directly before turning off the A/C switch reaches the target temperature of the evaporator, as a result of determining if the temperature of the evaporator directly before turning off the A/C switch reaches a target temperature of the evaporator when the A/C switch is turned on;
   performing the control by outputting the discharge capacity control value of the compressor to the maximum and then performing the proportional-integral control, when the lapse time from the turning off the A/C switch to the turning on thereof exceeds the control time, and concurrently performing the proportional-integral control after controlling the pressure control valve by outputting the discharge capacity control value of the compressor directly before turning off the A/C switch, when the lapse time from the turning off of the A/C switch to the turning on thereof is below the control time, as a result of determining if a lapse time from the turning off of the A/C switch to the turning on thereof is below a control time when the temperature of the evaporator directly before turning off the A/C switch reaches the target temperature of the evaporator;
   determining if the AIC switch is turned off, after performing the proportional-integral control; and
   storing the discharge capacity control value of the compressor directly before turning off the A/C switch, when the A/C switch is turned off, and concurrently counting and storing the lapse time from the turning off of the A/C switch to the turning on thereof.

2. The method for controlling an air conditioner for a vehicle according to claim 1, wherein the control time is one minute.

3. The method for controlling an air conditioner for a vehicle according to claim 1, further comprising a step of performing the maximum cooling air conditioning control to maximize the discharge capacity of the compressor and then performing the proportional-integral control, when the lapse time from the turning off of the A/C switch to the turning on thereof is within the control time, and when the target temperature of the evaporator is below 2° C., as a result of the determination of whether the target temperature of the evaporator is below 2° C., and then outputting the discharge capacity control value of the compressor directly before the turning off the A/C switch, when the target temperature of the evaporator exceeds 2° C.

4. The method for controlling an air conditioner for a vehicle according to claim 1, further comprising a step of determining if the temperature of the evaporator approaches the target temperature of the evaporator, and performing the proportional-integral control when the temperature of the evaporator approaches the target temperature of the evaporator, after performing the maximum cooling air conditioning control to maximize the discharge capacity of the compressor and then performing the proportional-integral control.

5. The method for controlling an air conditioner for a vehicle according to claim 2, further comprising a step of determining if the temperature of the evaporator approaches the target temperature of the evaporator, and performing the proportional-integral control when the temperature of the evaporator approaches the target temperature of the evaporator, after performing the maximum cooling air conditioning control to maximize the discharge capacity of the compressor and then performing the proportional-integral control.

6. The method for controlling an air conditioner for a vehicle according to claim 3, further comprising a step of determining if the temperature of the evaporator approaches the target temperature of the evaporator, and performing the proportional-integral control when the temperature of the evaporator approaches the target temperature of the evaporator, after performing the maximum cooling air conditioning control to maximize the discharge capacity of the compressor and then performing the proportional-integral control.

7. The method for controlling an air conditioner for a vehicle according to claim 4, wherein the temperature of the evaporator is determined to approach the target temperature of the evaporator when the temperature of the evaporator is within a range of ±2° C.

* * * * *